3,362,928
FLAME-RESISTANT DIALLYL PHTHALATE BASED MOLDING COMPOUND AND HEAT-STABLE ARTICLE PRODUCED THEREFROM
Abraham J. Dontje and Richard C. Berry, Danielson, Conn., assignors to Rogers Corporation, Rogers, Conn., a corporation of Massachusetts
No Drawing. Filed May 28, 1964, Ser. No. 371,132
6 Claims. (Cl. 260—41)

ABSTRACT OF THE DISCLOSURE

The present invention relates to a diallyl phthalate molding compound and particularly to such a molding compound containing flame-retardant agents. The molding compounds comprise a fusible diallyl phthalate polymer, a flame retardant organic chlorine containing compound, antimony oxide and hydrated alumina. The molding compounds preferably contain from about 5 to 10% by weight of the polymer of the flame retarding organic compound, at least 6% by weight of the polymer of antimony oxide and from 5 to 15% by weight of the polymer of the hydrated alumina.

---

Diallyl phthalate molding compounds are well known and of great commercial value. Because of the excellent electrical properties and moisture resistance of products obtained from them, they are often employed in the manufacture of electronic components and switches.

For these uses and others, it is also conventional to impart flame resistance by incorporating minor amounts of chlorinated organic compounds and antimony oxide. Inclusion of these materials in diallyl phthalate molding compounds, however, results in reduced thermal stability of parts molded therefrom. In particular, exposure of such parts to elevated temperatures will result in increased weight loss as compared to otherwise equivalent non-flame-resistant compounds, and to formation of phthalic anhydride crystals. The formation of phthalic anhydride crystals has been known to cause electrical failures in electronic components and switches.

Accordingly, it is the object of the present invention to provide a diallyl phthalate molding compound which is convertible by heat and pressure to a flame-resistant infusible insoluble article which is stabilized against weight loss and decomposition at elevated temperatures.

It has been found that the addition of certain metal oxides and salts to conventional diallyl phthalate molding compounds containing a chlorinated organic compound and antimony oxide will result in a flame-resistant article which is greatly inhibited as to weight loss when subjected to high temperatures.

A conventional diallyl phthalate molding compound will contain a soluble fusible prepolymer of diallyl phthalate and as representative of such a polymer, attention is directed to Example XI of the U.S. Patent to Pollack et al., No. 2,273,891. The prepolymer may have mixed with it a substantial proportion of the monomeric ester itself, as disclosed by Example IV of the U.S. Patent to Pollack et al., No. 2,370,578, and it will be understood that reference to the prepolymer in the following discussion and claims is intended to refer as well to a mixture of prepolymer and monomer. In general, the use of the substantially pure prepolymer is preferred.

Based on the weight of the prepolymer, the molding compound will ordinarily contain from 100-170% of an inorganic filler, such as clay, silica, glass fiber, or mixtures thereof, and from 3-5% of a polymerization catalyst which will ordinarily be an organic peroxide, such as benzoyl peroxide, t-butyl perbenzoate, lauryl peroxide or methyl ethyl ketone peroxide. The molding compound will also contain minor constituents such as dyes, pigments, inhibitors, lubricants, and sizes in the order of 5–20% total based on the weight of the prepolymer.

As stated earlier, flame resistance is imparted to the final molded article by including in the molding compound a mixture of a chlorinated organic compound and antimony oxide. The chlorinated organic compound may be any of those conventionally employed to impart flame resistance by furnishing free chlorine or hydrogen chloride by decomposition when subjected to high temperatures. In general, it may be said that there should be present an amount of the organic chlorine-containing compound capable of furnishing from 5 to 10% of chlorine, based on the weight of the prepolymer.

As representative of chlorinated organic compounds which may be employed, there may be mentioned diallyl chlorendate having the formula:

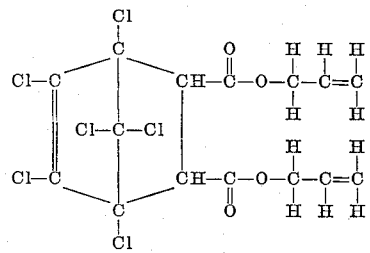

and perchloro pentacyclo decane, manufactured by Hooker Chemical Corporation under the trade name "Dechlorane" and having the formula:

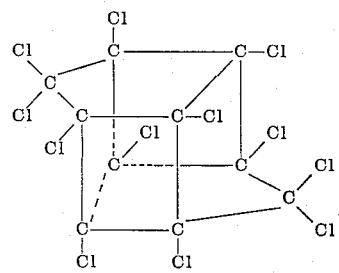

Of the two, diallyl chlorendate is preferred and, when used, there will be present in the molding compound from 10–15% based on the weight of the prepolymer. It will be noted that diallyl chlorendate is itself capable of polymerization during the curing of the molding compound under heat and pressure.

Antimony oxide will be present in the molding compound in an amount equal to at least 6% and while not critical, 6–10% is preferable based on the weight of the diallyl phthalate prepolymer.

Metal oxides and salts which have been found to impart heat stability to the molded articles in accordance with the present invention are hydrated alumina $$(Al_2O_3 \cdot 3H_2O)$$

zinc oxide, magnesium oxide, magnesium carbonate, calcium carbonate and magnesium silicate. Of these substances, hydrated alumina is greatly preferred since it stabilizes the molded articles against weight loss at elevated temperatures without causing any loss of flame resistance. All of the other substances named cause some loss of flame resistance when used in quantities sufficient to substantially lower the weight loss at an elevated temperature.

In general, it may be stated that there should be present in the molding compound from 5 to 15% of the stabilizing agent based on the weight of the prepolymer. When the preferred stabilizing agent, hydrated alumina, is employed, it is preferred that it be present within the range of 8–12%, again based upon the weight of the prepolymer.

The following example is given as illustrative of but not as limiting the invention:

*Example*

| Ingredient: | Parts by weight |
|---|---|
| Diallyl phthalate prepolymer (prepared in accordance with Example XI of U.S. Patent No. 2,273,891) | 100 |
| Hydrated alumina | 8.5 |
| Filler—glass fiber | 160 |
| Polymerization catalyst—t-butyl perbenzoate | 3.5 |
| Diallyl chlorendate | 10 |
| Antimony oxide | 7 |
| Stearic acid | 2 |

A quantity of the resulting powdered molding compound was placed in a mold and heated to a temperature of 160° C. under a pressure of 4000 p.s.i. for 10 minutes to produce an infusible insoluble article, this temperature being below that at which noticeable decomposition of diallyl chlorendate occurs.

The effectiveness of the formulation of the example was tested by comparing it with an identical formulation except that the hydrated alumina was omitted. For this purpose, identical disks 2 inches in diameter by ⅛ inch in thickness were molded under the conditions given above from each of the formulations, weighed, placed in a glass container and heated to 375° F. for 120 hours. After cooling, the disks were again weighed and examined for phthalic anhydride crystals. The results of the tests are shown in the following table:

| Specimen | Weight Loss, percent | Appearance |
|---|---|---|
| Control (no hydrated alumina). | 10 | Long needlelike crystals of phthalic anhydride. |
| Formulation of Example | 2.0 | No crystals detectable. |

The compounds described above were also molded into 5 inch long by ½ inch by ½ inch bars and tested for flame resistance by Federal Test Method Standard No. 406, Method 2023. Ninety seconds minimum ignition time and ninety seconds maximum burning time were used as criteria for flame resistance. It should be noted that where less severe flame resistance requirements are to be met, lower input levels of chlorinated compound, antimony oxide and stabilizing agent can be employed.

Since many apparently widely differing embodiments of this invention may be made without departing from its spirit and scope, it is to be understood that we do not limit ourselves to those specifically described herein, except as defined in the appended claims.

We claim:

1. A composition of matter comprising a fusible polymer of diallyl phthalate, a flame-retardant organic chlorine-containing compound in an amount capable of furnishing from 5 to 10% of chlorine based on the weight of said polymer, at least 6% of antimony oxide based on the weight of said polymer and from 5 to 15% based on the weight of said polymer of hydrated alumina, said composition being capable of forming when subjected to heat and pressure, a heat-stable, infusible, insoluble solid.

2. A composition as claimed in claim 1 in which said flame-retardant compound is selected from the group consisting of diallyl chlorendate and perchloro pentacyclo decane.

3. A composition as claimed in claim 2 which contains from 10–15% of diallyl chlorendate, at least 6% of antimony oxide and from 8–12% of hydrated alumina.

4. A flame-resistant, heat-stable, insoluble and infusible article comprising an insoluble and infusible polymer of diallyl phthalate containing an organic chlorine-containing compound in an amount capable of furnishing from 5 to 10% of available chlorine based on the weight of said polymer, at least 6% of antimony oxide based on the weight of said polymer and from 5 to 15% based on the weight of said polymer of hydrated alumina.

5. An article as claimed in claim 4 in which said organic chlorine-containing compound is selected from the group consisting of diallyl chlorendate and perchloro pentacyclo decane.

6. An article as claimed in claim 5 which contains from 10–15% of diallyl chlorendate, at least 6% of antimony oxide and from 8–12% of hydrated alumina.

References Cited

UNITED STATES PATENTS

| 2,463,983 | 3/1949 | Leatherman | 260—41 |
| 2,475,626 | 7/1949 | Leatherman | 260—41 |
| 2,874,144 | 2/1959 | Hanford | 260—45.7 |
| 3,093,619 | 6/1963 | Taylor et al. | 260—41 |
| 3,268,295 | 8/1966 | Armbrust et al. | 106—288 |

OTHER REFERENCES

Harvey, Paint Technology, vol. 16, issue 186, p. 263, June 1951.

ALLEN LIEBERMAN, *Primary Examiner.*